United States Patent [19]

Gorog

[11] Patent Number: 4,477,891
[45] Date of Patent: Oct. 16, 1984

[54] MULTI-BANDWIDTH OPTICAL PLAYBACK APPARATUS HAVING MINIMUM BASEBAND DISTORTION

[75] Inventor: Istvan Gorog, Princeton, N.J.

[73] Assignee: RCA Corporation, New York, N.Y.

[21] Appl. No.: 357,595

[22] Filed: Mar. 12, 1982

[51] Int. Cl.³ .............................................. G11B 7/00
[52] U.S. Cl. .................................................. 369/109
[58] Field of Search ...................... 369/44, 45, 46, 109, 369/110, 118, 124, 111; 358/340

[56] References Cited

U.S. PATENT DOCUMENTS

| | | | |
|---|---|---|---|
| 3,842,194 | 10/1974 | Clemens . | |
| 3,891,794 | 6/1975 | Russell | 369/111 |
| 3,919,465 | 11/1975 | Adler et al. | 369/109 |
| 3,919,562 | 11/1975 | Whitman | 369/118 |
| 4,044,379 | 8/1977 | Halter . | |
| 4,065,786 | 12/1977 | Stewart . | |
| 4,074,085 | 2/1978 | Russell | 369/44 |
| 4,349,901 | 9/1982 | Howe | 369/45 |
| 4,375,096 | 2/1983 | Gorog et al. | 369/118 |
| 4,376,303 | 3/1983 | Lurie | 369/45 |

*Primary Examiner*—Donald E. McElheny, Jr.
*Attorney, Agent, or Firm*—Eugene M. Whitacre; Joseph S. Tripoli; Jerald E. Roehling

[57] ABSTRACT

An optical playback system is used to recover data recorded in an elongated information track, comprising undulations representative of the data, on a surface of a record medium. The data is recorded over two substantially different frequency bands, for example, a video signal may be recorded over a high frequency deviation range and a sound signal may be recorded over a low frequency deviation range. The optical playback system is provided with a dual response characteristic. The response of the system to the low frequency signals is improved by utilizing a properly oriented linearly polarized readout light beam for recovering the low frequency signals, by using a light source that provides a relatively short wavelength light beam, and by providing an input stop for varying the effective numerical aperture of the objective lens and an output stop which is matched to the shape of the input stop.

4 Claims, 5 Drawing Figures

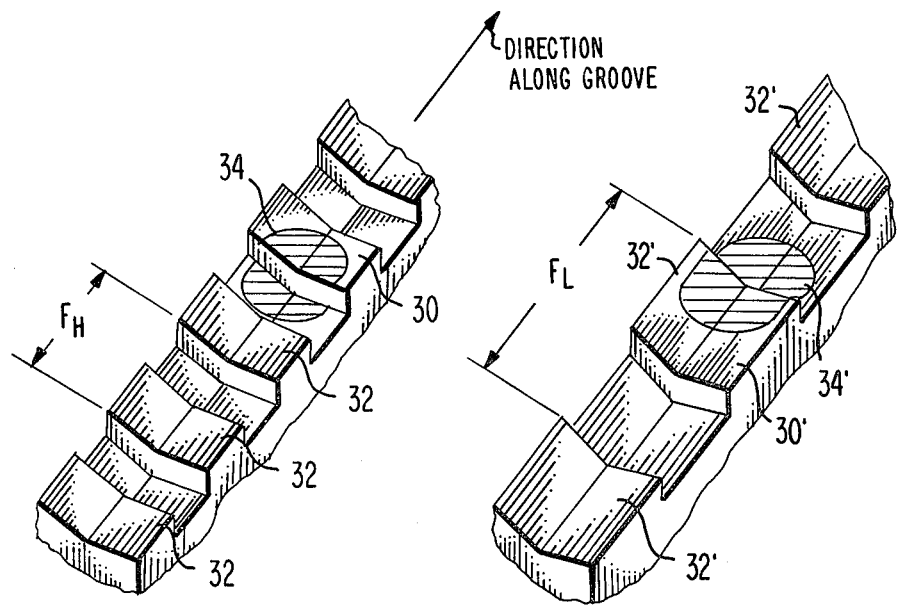
*Fig. 2A*   *Fig. 2B*
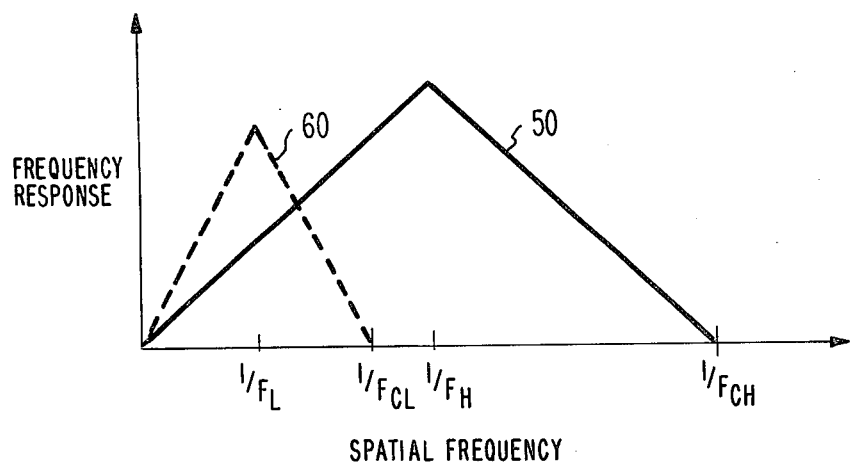
*Fig. 3*

MULTI-BANDWIDTH OPTICAL PLAYBACK APPARATUS HAVING MINIMUM BASEBAND DISTORTION

This invention relates to an apparatus for optically reading information recorded on the surface of a record medium and, more particularly, to apparatus for reading information which has been recorded over a relatively wide frequency band, for example, for reading video information recorded over a high frequency deviation range and audio information recorded over a relatively low frequency deviation range.

BACKGROUND OF THE INVENTION

The playback principles of the present invention are applicable to the recovery of data recorded in an information track as a succession of undulations of varying length along the length of the track.

In certain high density information playback systems, video information is recorded as relatively short wavelength (e.g., 0.4 $\mu$m relief variations along the length of an information track. Illustratively, the method of recording may be of the type shown in U.S. Pat. No. 4,044,379, issued to J. B. Halter. Pursuant to the Halter method, an electromechanically driven stylus (e.g., of diamond) responsive to a combined video and audio signal, records relatively short geometric variations representative of the time variations of the signal in a metal substrate. After the electromechanical recording operation, the metal substrate has a relief pattern corresponding to that which is desired in the final record. Stampers which are used to produce production line records are made from the substrate and a vinyl record is formed, having the desired relief pattern, from the stamper.

In one illustrative format for electromechanical cutting disclosed in the Halter patent, an encoded video signal is additively combined with the accompanying encoded audio signal. In accordance with this method, the accompanying encoded audio signal is obtained by causing the audio signal to frequency modulate a low frequency sound carrier over a low frequency deviation range (illustratively, 716 ±50 KHz). The encoded video signal is obtained from a picture modulator, wherein the composite color video signal (including luminance signals occupying a given band of frequencies and chrominance signals appearing as sideband components of a modulated chrominance subcarrier interleaved with the luminance signal components in an intermediate region of the given band) is caused to frequency modulate a high frequency picture carrier over a high frequency deviation range illustratively, 4.3–6.3 MHz). The peak to peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be a Halter electromechanical recorder controlled in response to the signal developed by the adder. The recorder is used to record the composite signal as geometric variations (i.e., undulations) on the metal substrate.

The specification of the sound carrier recorded on a video disc is generally critical to the performance of the video disc system. The peak-to-peak amplitude of the sound carrier recorded on a high density information record, such as a video disc described in U.S. Pat. No. 3,842,194 to J. K. Clemens is very small—illustratively, the sound carrier amplitude may be 85 Å peak-to-peak. Deviation of the amplitude of the sound carrier from that which is specified may adversely affect the quality of the video and audio reproduction. For example, if the sound carrier is not cut deep enough the signal-to-noise ratio may be degraded or, on the other hand, if it is cut too deep then sound beats may be visible during the video reproduction.

To assure high quality video and audio reproduction during disc playback, it is generally agreed that certain measurements regarding the quality of the information recorded on the metal substrate should be made prior to producing production line records. The present invention provides an optical playback apparatus that may be used for reproducing, and thus veryifying, the information recorded according to the Halter electromechanical recording method.

In its simplest form, the surface pattern of a metal substrate can be considered as a set of adjacent and parallel one-dimensional gratings with no guard space between the adjacent gratings. The gratings correspond to the signal tracks. The video signal wavelengths, especially on the inner radius signal tracks, are much smaller than the track-to-track spacings. Illustratively, the track spacing is about 2.5 $\mu$m.

An objective lens of an optical playback system of numerical aperture (N.A.) whose aperture is fully illuminated with a plane wave of light having wavelength $\lambda$ produces at its focal plane a focused spot such that about one-half of the optical power is within a circle of diameter D where $$D = \lambda/2NA \tag{1}$$

The illuminating optics of the optical playback apparatus should be chosen such that the focused spot diameter is small enough to both resolve the shortest wavelength of interest and to maintain adjacent track crosstalk at an acceptably low level. Therefore, in practice extremely high numerical apertures (e.g., NA>0.8) must be used to resolve the smallest signal wavelengths on the metal substrates.

One optical playback system for reading a metal substrate having signals cut according to a Halter method is described in U.S. Pat. No. 4,065,786 issued on Dec. 27, 1977 to W. C. Stewart. According to the Stewart system, the differential phase representative of the recorded information of a light beam reflected from the metal substrate surface is detected by a split photodetector. Thus, the output signal from the split photodetector is representative of the signal recorded on the metal substrate surface. The frequency response of a differential phase optical playback system to sine wave signals may be approximated by a triangular response characteristic having a peak response in the middle of the frequency band with a linear roll off to an upper and lower cutoff frequency.

Ideally, lenses should be selected such that frequencies of the recorded information occur in the vicinity of the peak response of the optical system. However, it is very difficult to provide an optical system having a uniform response to wideband signals. For example, in a recording system where slot shaped signal elements are recorded on a flat surface, if the differential phase optical readout system is operated with a uniformly illuminated diffraction limited objective lens having a rectangular aperture and the lens is chosen so that the optical readout system is optimized for a video signal of 5 MHz at a particular radius, the response of the system to the 716 KHz audio signal will be about 17 dB lower.

In accordance with U.S. patent application Ser. No. 242,250 entitled "Multi-Bandwidth Optical Playback Apparatus" filed on Mar. 10, 1981 for Istvan Gorog et al., now U.S. Pat. No. 4,375,096 (hereinafter, the Gorog apparatus) an optical playback apparatus is described for reproducing the information recorded on the metal substrate to verify the quality thereof. The Gorog apparatus includes a high numerical aperture lens for use in reading the information recorded. If the high numerical aperture objective lens performed in a truly ideal manner, i.e., as an ideal diffraction limited focusing device, then the reproduction of the information recorded would contain no signal distortions because signal distortions produced in one half of a split detector, as described in the aforementioned Stewart patent, would exactly cancel the signal distortions produced in the other half of the split detector. However, a real objective lens is not ideal and signal distortions that are the result of the imperfections of the lens system and are produced in the square-law detector are present in the reproduced output. The particular type of distortion of interest here is known as baseband distortion. This distortion, that can be produced by an imperfect real optical system when reading video signals encoded according to the Clemens patent, may significantly interfere with the recovery of the audio signals encoded according to the Clemens patent. To reduce these distortions, the Gorog apparatus provides a dual bandwidth apparatus for reading the information. In accordance with the Gorog apparatus the video information, recorded in accordance with the aforementioned Halter patent, is read out using an objective lens having a high numerical aperture while the audio information is readout using an objective lens having a low numerical aperture. The same objective lens is used to readout the video and audio but a stop is interposed in the readout beam path of the audio readout beam. The stop modifies the readout system by effectively reducing the numerical aperture of the objective lens. In other words, the stop acts as a filter for eliminating the video information that, as a result of baseband distortions produced by an imperfect real optical system, may produce interference with the recovery of the audio information.

The Gorog apparatus is quite effective in reducing some of the video baseband distortions which appear in the audio channel, nevertheless, some distortions are still evident and may distract a viewer during verification of a metal substrate. For example, when certain structured scenes, i.e., a picket fence, recorded according to the Halter and Clemens patents on the inner disc radii are being readout with an optical system, using a circularly polarized 633 nm wavelength light beam so much baseband distortion may be produced in the audio channel that the audio information becomes unintelligible.

Baseband distortions in optical readout systems may be thought of as two types. During optical playback of a metal substrate formed in accordance with the aforementioned Clemens format baseband distortion may be produced in an imperfect real optical system by the combination of the aperture response of the detection system and the non-linearity inherent in square-law optical detectors as indicated above. The distortion produced by the aperture and detector responses may be reduced or eliminated by the aforementioned Gorog apparatus. The second source of baseband distortion is the spatial frequency dependent phase shift that is exhibited by light diffracted from a grating wherein the ratio of the wavelength of the readout light beam to the period of the grating approaches, and possibly exceeds, unity. As the grating pitch varies with the content of the video information, phase shifts in the readout light beam used for recovery of the audio information effects signal distortions in the audio channel. This second source of baseband distortion has not been adequately compensated for in prior art devices.

SUMMARY OF THE INVENTION

In accordance with the principles of the present invention, an optical playback apparatus is provided wherein baseband distortions are minimized.

In accordance with one aspect of the present invention, an optical playback system for recovering data from a disc-shaped storage medium is provided. In the system, the data is recorded on a surface of the storage medium along the length of a spiral information track. The data is recorded within a first given band of low frequencies and a second given band of high frequencies. The information track has a succession of undulations representative of the data along the length thereof. The undulations have a first given range of spatial wavelengths corresponding to the first given band of frequencies and a second given range of spatial wavelengths corresponding to the second given band of frequencies. The system includes a first light source which emits a beam of radiation of a first given wavelength. The beam of radiation is linearly polarized. A first light path couples the first light source and the surface of the disc. An objective lens, positioned in the first light path, focuses the beam of radiation to a spot on the information track, the spot has a dimension along the length of the information track. The shape of the light beam is altered by first means for modifying the shape of the light beam such that the dimension of the light spot along the length of the information track is greater than the diameter of a diffraction limited spot formed from the beam of radiation by the objective lens. In the system, relative motion is established between the light spot and the information track. Further, the system includes means, responsive to the interaction of the focused light and the undulations during the occurrence of the relative motion, for developing signals representative of the data recorded in the information track. A second light path couples the surface of the disc and the developing means. Positioned in the second light path is second means for modifying the shape of the light beam that is reflected off of the disc surface. The beam shape is modified such that light responsive to the interaction of the focused light and the undulations of the second given range of spatial wavelengths is blocked from reaching the developing means.

In accordance with another aspect of the present invention, an optical playback system is provided which includes first and second light sources. The first light source emits a first beam of radiation of a first given wavelength which is linearly polarized. The second light source emits a second beam of radiation of a second wavelength. The first and second beams of radiation are combined by means for combining to form a single beam path from the combining means to the surface of the disc. An objective lens, positioned in the single beam path, focuses the beams of radiation to respective spots on the information track of the record medium. The light spot formed from the first beam of radiation has a dimension along the length of the information track. The shape of the light beam from the first light source is altered by first means for modifying, interposed between the first light source and the combining means. The shape of the beam is altered such that the dimension of the light spot formed from the first beam is greater than the diameter of a diffraction limited spot formed from the first beam by the objective lens. The system further includes first and second means for developing signals representative of the data recorded. Means are provided for directing the first beam such that the first beam is incident on the first means for developing and for directing the second beam such that it is incident on the second means for developing. Interposed between the means for directing and first means for developing is a second means for modifying the shape of the first beam of radiation. The second means for modifying blocks light responsive to the interaction of the light spot formed from the first beam and the undulations of the second given range of spatial wavelengths from reaching the first means for developing.

BRIEF DESCRIPTION OF THE DRAWING

Other features and advantages of the invention will be more fully understood from the following detailed description of the preferred embodiment, the appended claims and the accompanying drawing in which:

FIGS. 2A and 2B show perspective views of a signal track of a Clemens' type video disc record;

FIG. 3 shows graphically the frequency response characteristic of the optical system of FIG. 1.

DESCRIPTION OF THE PREFERRED EMBODIMENT

Figure 1:
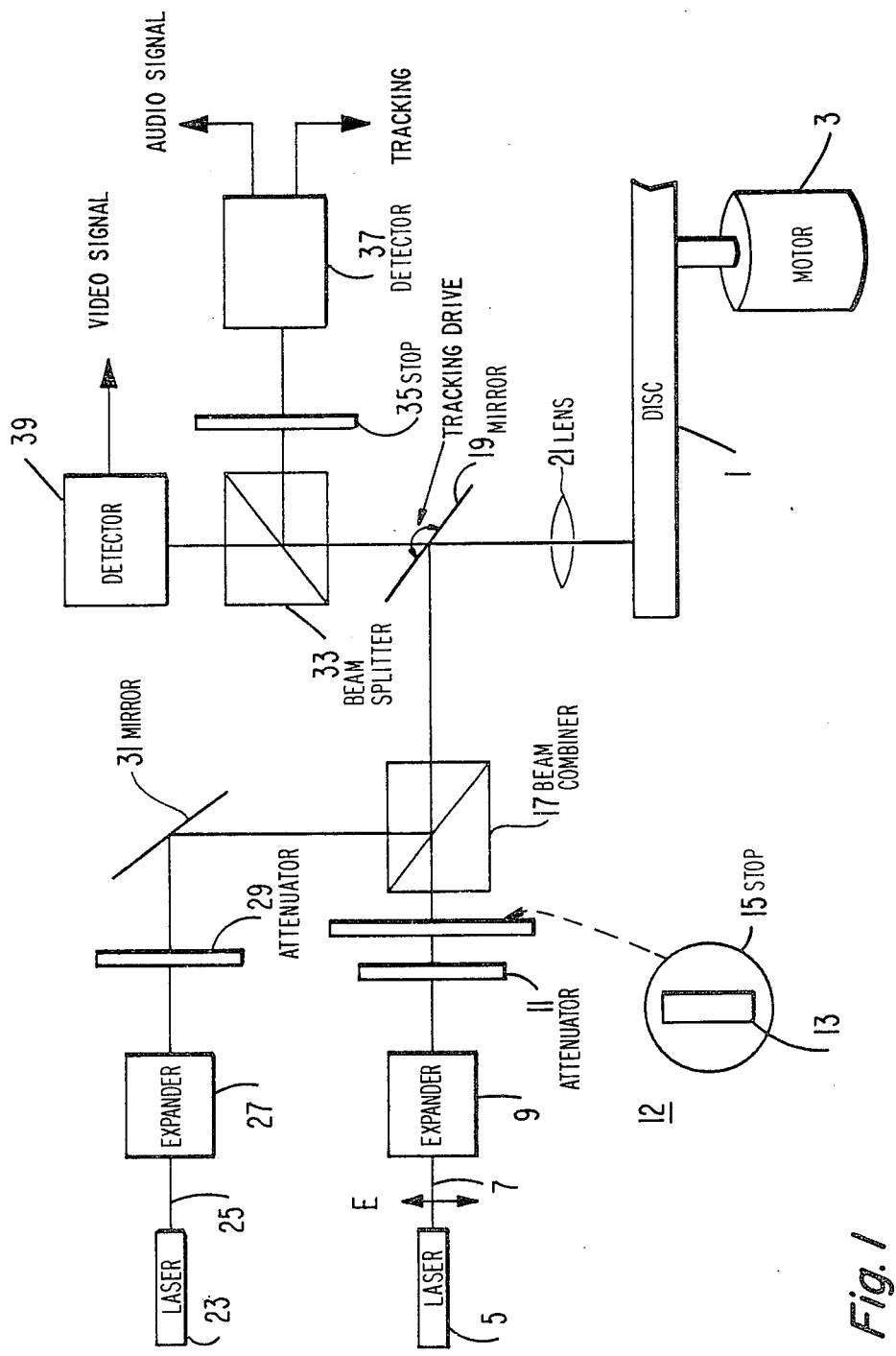
FIG. 1 is a schematic diagram, partially in block diagram form, of an optical playback system in accordance with the principles of the present invention.

Referring to FIG. 1, in the apparatus shown, a disc-shaped record carrier (substrate) 1 is rotated by a motor 3. Illustratively, record carrier 1 may be of a type described in the aforementioned Halter patent, i.e., a metal substrate which has been recorded in accordance with the method described in the aforementioned Clemens patent. After the electromechanical recording operation, the recorded surface of the metal substrate 1 has a relief pattern corresponding to that which is desired in a final production record, i.e., the plastic replica disc.

The apparatus of FIG. 1 provides a two-beam system, one beam for verifying the video information cut on the metal substrate and the other beam for verifying the low frequency audio information. A source of radiation 5 emits a beam of light 7. Illustratively, radiation source 5 may be a helium-cadmium laser emitting a beam of linearly polarized coherent light of generally circular contour at a wavelength of 442 nm. The beam of light 7 enters beam expander 9 and emerges generally with no change in shape but enlarged in cross section. This enlarged light beam enters attenuator 11. Attenuator 11 which may be a neutral density filter reduces the amount of light reflected from carrier 1 that can reach laser 5 to effect unwanted feedback. The beam 7 passes through the aperture 13 of stop 15. A side view of stop 15 is shown in auxiliary view 12. The operation of stop 15 will be explained in detail herein. The enlarged light beam enters the entrance face of beam combiner 17 and emerges therefrom. Beam combiner 17 may be a dichroic element that passes light of one wavelength and reflects light of another wavelength. The light beam is incident on tracking mirror 19 which reflects the beam to pass through objective lens 21. Lens 21, interposed between tracking mirror 19 and substrate 1, receives the light beam and focuses the beam to form a light spot on an information track of substrate 1. Illustratively, lens 21 may be maintained in a focus position by means as described in copending U.S. patent application Ser. No. 218,073, filed on Dec. 19, 1980 for M. J. Lurie, now U.S. Pat. No. 4,376,303. Further, light beams 7 may be directed to track the center of an information track on the surface of substrate 1 by use of a quadrant detector described in the aforementioned Stewart patent.

A second source of radiation 23 emits a beam of light 25. Illustratively, radiation source 23 may be a helium-neon laser emitting a beam of coherent light of generally circular contour at a wavelength of 633 nm. Beam 25 passes through beam expander 27 and attenuator 29. Beam expander 27 and attenuator 29 perform the same functions as beam expander 9 and attenuator 11 perform with respect to beam 7. Expanded beam 25 is reflected off of mirror 31 to be incident on beam combiner 17. Beam combiner 17, in this case, reflects beam 25 to follow the path of beam 7 to the surface of substrate 1.

The focused light beams 7 and 25 are diffracted by the recorded data which appears in an information track as a succession of undulations. The reflected light is collected by lens 21 and is transmitted through tracking mirror 19 on the second pass. The reflected light arrives at beam splitter 33. Beam splitter 33, which may be a dichroic element which reflects one wavelength of light and transmits a second wavelength of light, separates the combined light beams. Light beam 7 is reflected in a direction orthogonal to the incident path and light beam 25 is transmitted through beam splitter 33. From beam splitter 33 light beam 7 passes through the aperture in stop 35, the operation of stop 35 will be explained in detail herein, to impinge onto a light accepting region of light detector 37. Light beam 25 impinges on a light accepting region of light detector 39. Illustratively, detectors 37 and 39 may be split photodetectors of a type illustrated in the aforementioned Stewart patent. The output signals from detectors 37 and 39 are delivered to suitable circuitry (not shown) for processing and subsequent display on a television receiver (for example).

An explanation of the operation of the optical playback system will now be made. FIG. 2A represents a V-shaped signal track 30 having undulations 32 recorded therein at a spatial wavelength $F_H$. For ease of illustration, the undulations of FIGS. 2A and 2B are shown as having steep, square wave-like transitions. The following discussion applies equally to sinusoidal undulations such as in the preferred Halter method. As a matter of fact, wherever reference is made to spatial wavelength ($F_H$, $F_L$), it is to be understood that the reference is being made to a sinusoidal Fourier component having spatial wavelength $F_H$, $F_L$. Illustratively, the spatial wavelength $F_H$ may be in the middle of the video bandwidth described in Halter (e.g., 5 MHz of a Clemens type video disc recorded at the inside radius of the substrate). The read beam of this system is shown as a light spot 34 impining in the center of signal track 30. Preferably light spot 34 is focused according to equation 1 as a diffraction limited spot on information track 30. To readout the video information lens 21 of FIG. 1 must have a high numerical aperture, typically, greater than 0.8, and light beam 25 must completely fill the aperture of lens 21.

Referring to FIG. 3, curve 50 indicates a triangular frequency response which is an approximation of the complex response of the optical system of FIG. 1 when the aperture of lens 21 is fully illuminated. The aperture is chosen such that the peak response $1/F_H$ occurs near the middle of the high frequency band (illustratively, at 5 MHz for the Clemens system). The problem with such an arrangement is that when the aperture is chosen to optimize the high frequency response, the low frequency response suffers. For example, with respect to the Clemens disc, when the system is chosen for peak response in the middle of the video band (e.g., 5 MHz) the response in the audio band is down almost 20 dB, thus adversely affecting the measurement of test bands on a Halter substrate or providing an audio response which is substantially degraded.

In accordance with the Gorog apparatus, the optical playback system is provided with an improved response at low frequencies. According to Gorog, a system is provided that has two differently dimensioned illumination systems and, therefore, a substantial improvement in signal response at the low frequency end is realized.

Referring to FIG. 2B, a signal track 30' is shown having undulations 32' recorded therein at a spatial wavelength $F_L$. Illustratively, the pit spacing at low frequencies may be seven times the pit spacing at high frequencies. According to the Halter system, the spatial wavelength $F_L$ may be at the audio frequency (e.g., 716 KHz of a Clemens type video disc).

The Gorog apparatus discloses that the signal-to-noise ratio of the optical system response at low frequencies may be improved if the numerical aperture of lens 21 is reduced for reading the low frequency signals. For example, if a slit is used to modify the spot dimensions the S/N is improved. The slit has the effect of reducing the amount of non-signal bearing light and relocating the signal bearing light to the center of the aperture. Both of these consequences effected an improvement of the system performance. The Gorog apparatus includes a stop having a slit-shaped opening interposed between laser 5 and substrate 1, i.e., stop 15. With stop 15 positioned as shown in FIG. 1, light beam 7 passes through slit 13, thus shaping the light beam which passes through to objective lens 21. By interposing slit 13 in the light beam path the effective numerical aperture of lens 21 is reduced in the signal direction and thus the light spot 34' on the surface of the substrate is extended along the length of the information track as shown in FIG. 2B.

The second source of baseband distortion discussed supra has not been eliminated by the aforementioned Gorog apparatus. It can, however, be substantially reduced by the following:

(1) Using a linearly polarized light beam whose electric field vector, $\bar{E}$, is oriented such that the electric field vector is perpendicular to the information track at the surface of the substrate;

(2) Using a laser having a short wavelength for the low resolution audio detection beam, e.g., using a helium-cadmium laser operating at 442 nm wavelength for the audio beam and a helium-neon laser operating at 633 nm wavelength for the video beam; and (3) Using an output stop between the substrate and light detector whose opening is matched to that of the input stop.

Figure 4:
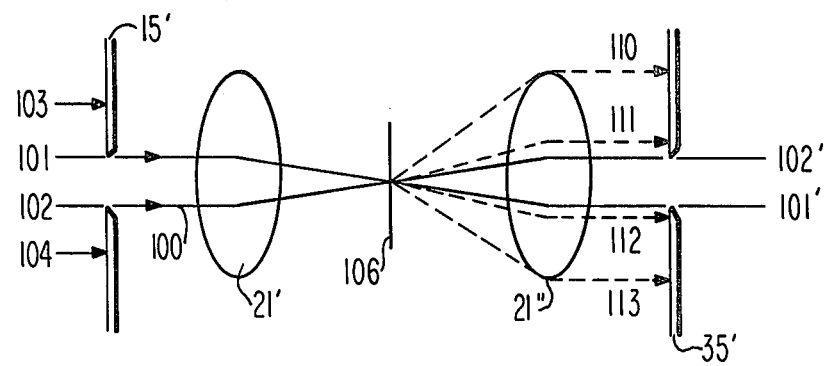
FIG. 4 illustrates a detailed diagram of one aspect of the optical arrangement of the invention.

The modification of the optical playback system to provide improved low frequency response will now be discussed with reference to FIGS. 1 and 4. The apparatus of FIG. 1 is provided with a source of radiation 5 which emits a linearly polarized light beam for recovering the low frequency signals. Source 5 is oriented such that the electric field vector $\bar{E}$ of light beam 7 impinges on substrate 1 with the vector pointed orthogonal to the length of the information track. It is believed that vector wave diffraction effects are responsible for the improvement in the signal-to-noise ratio which occurs when the polarization of the readout beam is oriented as discussed above. Although the scalar theory commonly used to analyze optical diffraction phenomena, does not predict a change if the polarization of the incident beam is varied it has been shown experimentally that there is a measurable improvement when the light beam is properly oriented.

As the spatial wavelength of the high frequency information, e.g., the video information at the inside radius of the disc, approaches the wavelength of the readout light beam in a dual bandwidth system, variations in the frequency of the high frequency information distort the signal recovered in the low frequency range, i.e., baseband distortion. In the dual beam system, the baseband distortion, interfering with the faithful recovery of the low frequency information, is believed to be the result of spatial frequency dependent phase shifts experienced by the low resolution beam upon reflection from the surface having high frequency undulations thereon. These distortion effects become especially strong when the range of the spatial wavelengths of the high frequency recorded information is such that the wavelength of the light beam used to recover the low frequency information falls within this range. One way to reduce these distortion effects is to choose the wavelength of the low frequency readout light beam to be of a value shorter than the shortest recorded wavelength of high frequency information. Contrary to prior art thinking, associating short wavelength readout beams with the recovery of hiqh frequency information and long wavelength readout beams with the recovery of low frequency information, in accordance with the teachings of the present invention, the short wavelength light beam is preferably used to recover the low frequency information. Recovery of the high frequency information with the longer wavelength light beam is satisfactory.

The third modification involves stop 35 shown in FIG. 1. For an explanation of stop 35 reference may be made to FIG. 4. Referring to FIG. 4 light beam 100 is shown bounded by light rays 101 and 102. Stop 15' is positioned in the path of beam 100 such that rays outside of the region between rays 101 and 102, illustrated by rays 103 and 104, are blocked. Lens 21' is used to focus beam 100 onto substrate surface 106. Light incident on surface 106 is diffracted by the undulations on the substrate surface. The light diffracted by the substrate surface undulations is collected by lens 21''. (For the convenience of illustration, the reflective optical system commonly used to readout the signals recorded as surface undulations on reflective substrates, is shown in FIG. 4 in the form of its equivalent transmission type optical system. Thus, lenses 21' and 21'' are the same lens in the actual reflection case, as shown in FIG. 1.) With respect to the audio channel the interference of the various light components is detected by a differential detector whose output contains signal components of the original recorded signal. Light diffracted by the high frequency video signal elements serves no useful purpose in audio detection, and, in fact, may produce unwanted distortion in the audio channel. To eliminate or reduce the effect of the video signal elements in the audio channel a stop 35' having an opening complementary to the opening in stop 15' is interposed between the collecting objective 21" and the detector (not shown). The light with the audio information between rays 101' and 102' is permitted to pass through the aperture of stop 35' while unwanted light illustrated by rays 110, 111, 112, 113 is blocked from reaching the detector. The unwanted light generally is that which interacts with the video signal elements.

The frequency response of the system of FIG. 1 may be represented by FIG. 3 which is shown as an approximation. Curve 50 represents the response characteristic at high frequencies obtained with light beam 25 and curve 60 represents the frequency response at low frequencies obtained with light beam 7.

While the principles of the present invention have been demonstrated with particular regard to the illustrated structure of the FIGURES, it will be recognized that various departures from such illustrated structure may be undertaken in practice of the invention. For example, stop 15 in FIG. 1 having a slit-shaped opening may be replaced with other devices such as an anamorphic beam expander that fills the aperture in one direction without the use of a slit. Also, the system is not limited to providing for only two bandwidths, of course, as many bandwidths may be provided for as physical considerations permit.

What is claimed is:

1. In an optical playback system for recovering data from a disc-shaped storage medium, said data being recorded on a surface of said storage medium along the length of a spiral information track and including data recorded within a first given band of low frequencies and data recorded within a second given band of high frequencies, said information track having a succession of undulations representative of said data along the length thereof, said undulations having a first given range of spatial wavelengths corresponding to said first given band of frequencies and having a second given range of spatial wavelengths corresponding to said second given band of frequencies, and apparatus comprising:

a first light source, said light source emitting a first beam of radiation of a first given wavelength;

a second light source, said light source emitting a second beam of radiation of a second given wavelength, said second given wavelength being shorter than said first given wavelength;

means for combining said first and second beams of radiation to form a single beam path extending from said combining means to said surface of said record medium;

an objective lens, positioned in said single beam path, for focusing said beams of radiation to respective spots on said information track;

first means, responsive to the interaction of the light spot formed from said second beam and the undulations of said first given band of low frequencies, for developing signals representative of said data recorded in said first given band;

second means, responsive to the interaction of the light spot formed from said first beam and the undulations of said second given band of high frequencies, for developing signals representative of said data recorded in said second given band;

means for directing said first beam such that said first beam is incident on said second means for developing and for directing said second beam such that said second beam is incident on said first means for developing; and means, responsive to said first and second means for developing signals, for providing signals representative of said data recorded on said surface of said storage medium.

2. The system according to claim 1 wherein said beam of radiation emitted by said second light source is a linearly polarized beam of radiation having its electric field vector perpendicular to the length of said information track.

3. The system according to claim 2 wherein said second light source is a helium-neon laser emitting a light beam having a wavelength of 633 nm and wherein said first light source is a helium-cadmium laser emitting a light beam having a wavelength of 442 nm.

4. The system according to claim 3 wherein the data recorded in said first given band of frequencies is audio information and wherein the data recorded in said second given band of frequencies is video information.

* * * * *